Oct. 15, 1935.  C. C. FARMER  2,017,794
BRAKE CONTROLLING DEVICE
Filed Aug. 2, 1933  2 Sheets—Sheet 1
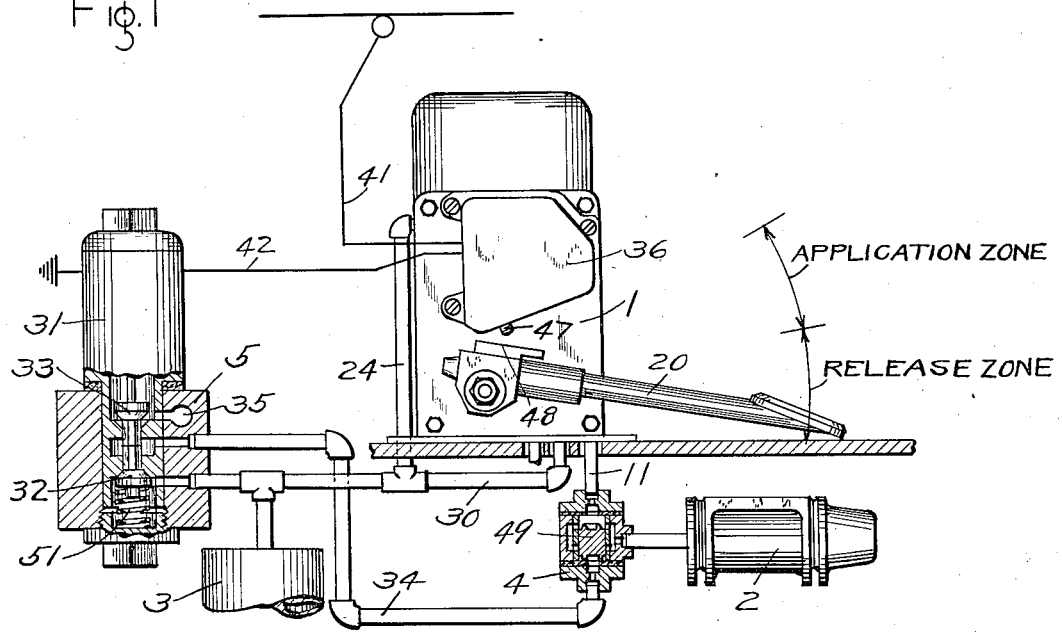
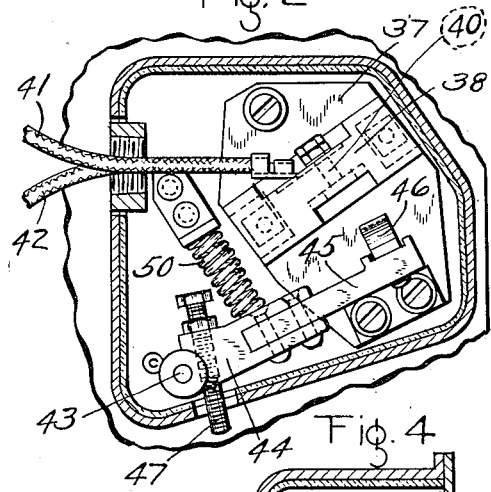
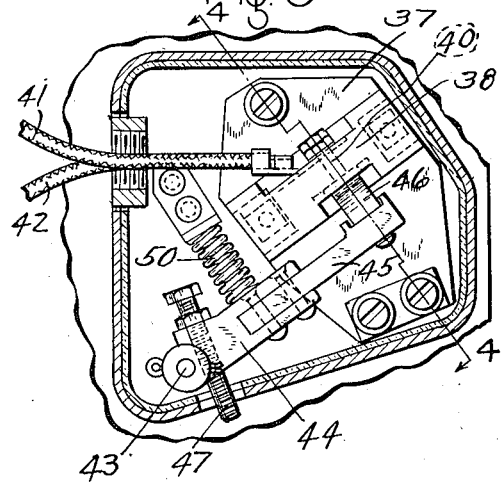
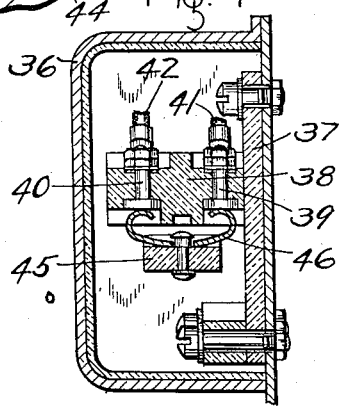
INVENTOR
CLYDE C. FARMER
BY  Wm. M. Cady
ATTORNEY Oct. 15, 1935.    C. C. FARMER    2,017,794
BRAKE CONTROLLING DEVICE
Filed Aug. 2, 1933    2 Sheets-Sheet 2
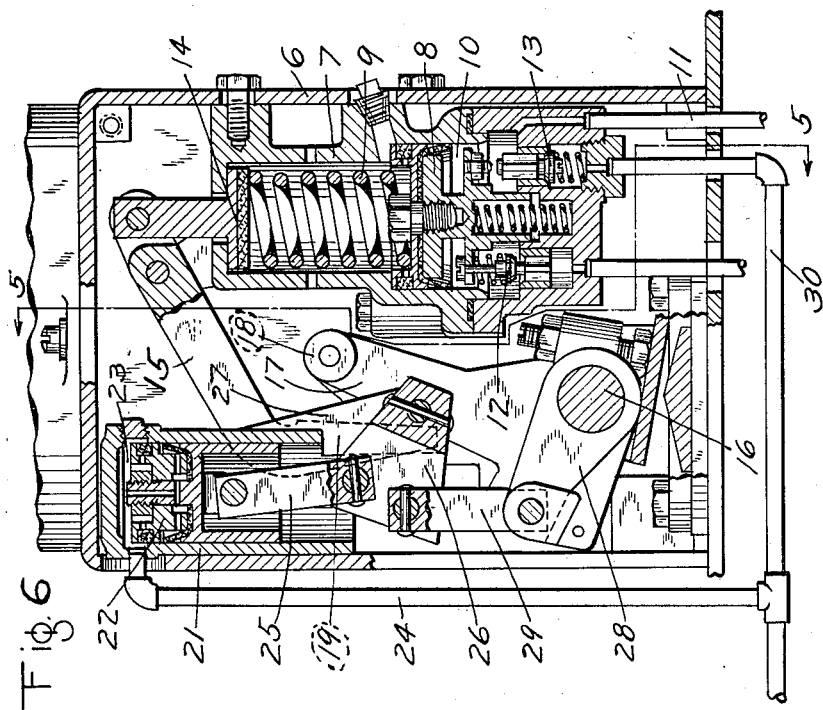
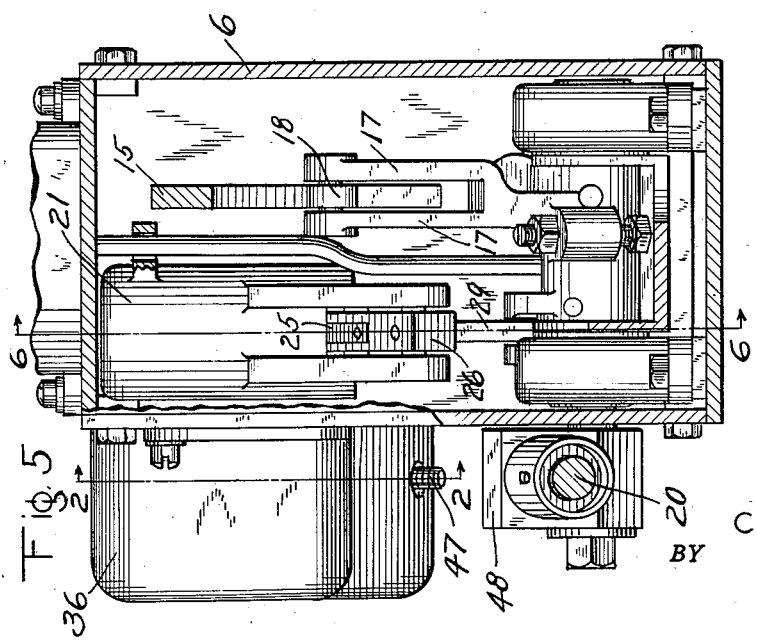
INVENTOR
CLYDE C. FARMER
BY
*Wm. M. Cady*
ATTORNEY Patented Oct. 15, 1935

2,017,794

UNITED STATES PATENT OFFICE 2,017,794

BRAKE CONTROLLING DEVICE

Clyde C. Farmer, Pittsburgh, Pa., assignor to The Westinghouse Air Brake Company, Wilmerding, Pa., a corporation of Pennsylvania Application August 2, 1933, Serial No. 683,335

1 Claim. (Cl. 303—54)

This invention relates to brake valve devices for fluid pressure brake systems, and more particularly to a self-lapping brake valve such as that disclosed in the prior application of John S. McWhirter and Rankin J. Bush, Serial No. 644,-448, filed November 26, 1932.

With a self-lapping brake valve of the above type, there is provided a movable abutment which is subject to the opposing pressures of a spring and the pressure of fluid supplied to the brake cylinder. When the spring is compressed by manual means against the abutment, the abutment is moved to open a valve for supplying fluid under pressure to the brake cylinder and when the brake cylinder pressure has been increased to a degree slightly exceeding the pressure of the spring, the abutment is moved by the brake cylinder pressure so as to lap or seat the supply valve.

The pressure of fluid supplied to the brake cylinder is thus limited or regulated according to the degree that the spring is compressed.

The spring is such that the maximum degree of pressure obtained in the brake cylinder by compression of the spring is considerably less than the full degree of pressure of the source of fluid pressure such as seventy pounds with a main reservoir pressure of one hundred pounds.

It is, however, desirable to be able to secure the full main reservoir pressure in the brake cylinder under emergency conditions and the principal object of my invention is to provide means operative in the full service position of a self-lapping brake valve for supplying fluid at the full pressure of the source of fluid under pressure to the brake cylinder.

In the accompanying drawings; Fig. 1 is a diagrammatic view of a fluid pressure brake equipment, showing my improvement embodied therein; Fig. 2 a section on the line 2—2 of Fig. 5, showing the construction of the electric switch portion of my invention, with the movable switch member in open circuit position; Fig. 3 a similar section, showing the movable switch member in its closed circuit position; Fig. 4 a section of the switch portion on the line 4—4 of Fig. 3; Fig. 5 a vertical section of the self-lapping brake valve device on the line 5—5 of Fig. 6; and Fig. 6 a section on the line 6—6 of Fig. 5.

As shown in Fig. 1, the equipment may comprise a self-lapping brake valve device 1, a brake cylinder 2, a main reservoir 3, a double check valve device 4, and a double beat magnet controlled valve device 5.

The self-lapping brake valve device 1 shown in the drawings is similar to that disclosed in the prior application hereinbefore referred to, and comprises a housing 6 in which is mounted a cylinder 7 containing a piston 8, subject on one side to the pressure of a spring 9 and having the chamber 10 at the opposite side open to the brake cylinder 2, by way of pipe 11.

The piston 8 is adapted to control the operation of a release valve 12 and a fluid pressure supply valve 13. A movable member 14 bears against the upper end of spring 9 and a lever 15, pivotally mounted on the cylinder 7 is pivotally connected to the member 14.

A shaft 16 is mounted in suitable bearings within the housing 6 and secured to said shaft is an arm 17 having a roller 18 at its free end which is adapted to engage the face of a downwardly extending arm 19 of the lever 15, when the shaft 16 is rotated in a counter-clockwise direction.

Secured to a section of the shaft 16 which extends outside of the housing 6 is a treadle 20.

Another cylinder 21 is mounted in the housing 6 and contains a piston 22, the chamber 23 at the upper face of which is connected, through pipe 24 with the main reservoir 3. A link 25 is pivotally connected to the piston 22 and to a member 26 which is pivotally carried on a supporting bracket 27.

A lever 28 is secured to the shaft 16 and a link 29, pivotally connected to said lever, is pivotally connected to the member 26.

Fluid under pressure acting on the piston 22 in chamber 23 urges the piston 22 downwardly and tends, through the linkage connections to rotate the arm 28 and shaft 16 in a counter-clockwise direction. As a consequence, the pedal lever 20 must be held depressed by the foot of the operator, in order to maintain the parts in release position, as shown in Fig. 1.

When it is desired to apply the brakes, the pressure of the foot on the treadle 20 is relieved to a certain extent, to permit the movement of the pedal lever 20 into the application zone, by the action of fluid pressure on the piston 22. In this movement, the roller 18 is moved into engagement with the working face of the arm 19 and then the lever 15 is rotated so that the member 14 operates to compress the spring 9.

The pressure of spring 9 then operates to move piston 8 downwardly, so as to first seat the release valve 12 and then unseat the supply valve 13, so that fluid under pressure is supplied by way of pipe 30 to chamber 10 and to the brake cylinder 2.

When the pressure of fluid acting in chamber 10, slightly exceeds the opposing pressure of spring 9, the piston 8 is moved upwardly until the supply valve 13 is seated, thus cutting off the further flow of fluid to the brake cylinder.

The brake cylinder pressure may be increased by permitting a further upward movement of the pedal 20, so as to cause a further compression of the spring 9. The piston 8 is then caused to again move downwardly so as to unseat the supply valve 13 and permit the further supply of fluid under pressure to the brake cylinder until the brake cylinder pressure acting in chamber 10 again slightly exceeds the pressure of the spring 9, the piston 8 then being again moved upwardly to permit the valve 13 to seat.

In the above described operation of the brake valve device, the pressure of fluid supplied to the brake cylinder is determined by the degree to which the spring 9 is compressed. According to the principal object of my invention, means are provided by which the brake cylinder pressure may be built up to the full pressure carried in the main reservoir, by permitting the pedal lever 20 to move to or nearly to the limit of its upward movement through the application zone.

For this purpose, the double beat magnet controlled valve device 5 is provided, which comprises a magnet 31 and double beat valves 32 and 33 adapted to be controlled by said magnet.

The valve 32 controls communication from the main reservoir supply pipe 30 to a pipe 34 which leads to one side of the double check valve device 4, and the valve 33 controls communication from pipe 34 to an atmospheric exhaust port 35.

For controlling the circuit of the magnet 31, a switch device is provided, comprising a casing 36 secured to the housing 6 on the side where the pedal 20 is located. Within the casing is mounted a plate 37 of insulating material, to which is secured a block 38 of insulating material.

Mounted on the block 38 are fixed contact members 39 and 40, the contact member 39 being connected to a wire 41 leading to a source of electric current, such as the trolley, and the other contact member 40 being connected to a wire 42 leading to one terminal of the magnet 31, the other terminal of which is connected to ground.

Mounted in the casing 36 on a pivot pin 43 is an arm 44 to which is secured a switch carrying member 45 of insulating material. The member 45 carries a bridging contact member 46, which is adapted to bridge the contacts 39 and 40. Adjacent to the pivot pin 43, an adjustable screw 47 is threaded into the arm 44, the end of the screw being engageable by a member 48 carried by the pedal lever 20.

The screw 47 is adjusted as desired, so that the member 48 will engage the end of the screw 47 when the pedal lever 20 has been permitted to move up nearly to the upper limit of the application zone.

The double check valve device 4 contains a double check valve 49 which is operated by fluid under pressure supplied by operation of the brake valve device to open communication from the brake cylinder supply pipe 11 to the brake cylinder 2 and to close communication from the by-pass supply pipe 34 to the brake cylinder. When fluid under pressure is supplied by operation of the magnet valve device 5 to pipe 34, the double check valve 49 is operated to open communication from the pipe 34 to the brake cylinder and to close communication from the pipe 11 to the brake cylinder.

In operation, with fluid under pressure supplied from the main reservoir to the chamber 23 above the piston 22, the piston 22 is urged downwardly, tending to rotate the shaft 16 in a counter-clockwise direction, so as to cause the arm 17 to move and the roller 18 to engage the arm 27 and the operator must maintain foot pressure on the pedal 20, in order to prevent this movement.

If it is desired to apply the brakes, the operator permits the pedal 20 to rise into the application zone, so that the spring 9 is compressed to the extent that the pedal is allowed to move upwardly in the application zone.

The pressure thus exerted by the spring 9 on piston 8 causes the piston to move downwardly, so as to first effect the seating of the release valve 12 and then the unseating of the supply valve 13. Fluid under pressure is then supplied from the main reservoir pipe 30 to the brake cylinder pipe 11 and thence past the double check valve 49 to the brake cylinder 2.

When the pressure of fluid supplied to chamber 10 and the brake cylinder slightly exceeds the opposing pressure of the spring 9, the piston 8 is moved upwardly sufficiently to close or seat the supply valve 13 and thus cut off the further supply of fluid to the brake cylinder.

The pressure of fluid supplied to the brake cylinder may be further increased by permitting a further upward movement of the pedal 20, so as to cause a further compression of the spring 9, as will be evident.

If the operator desires to obtain the full main reservoir pressure in the brake cylinder or if the operator should accidentally or intentionally remove his foot the movement of the pedal lever 35 to or nearly to the upper limit of the application zone will cause the member 48 to engage the screw 47 and then shift the arm 44 upwardly, so that the contact 46 bridges the contacts 39 and 40.

A circuit is thus closed through the magnet 31, so that the magnet is energized and thereby the valve 33 is moved to its seat, cutting off communication from pipe 34 to the exhaust port 35, and the valve 32 is unseated, so that fluid under pressure is supplied from the main reservoir pipe 30 to pipe 34.

If fluid under pressure has previously been supplied to the brake cylinder through pipe 11, the double check valve will be seated at its lower seat, but as soon as the pressure of fluid supplied through pipe 34 exceeds the fluid pressure acting above the double check valve, the double check valve will be shifted to its upper seat, and communication will be opened from pipe 34 to the brake cylinder, so that the brake cylinder pressure will then be built up to the full main reservoir pressure.

The brakes may be released by moving the pedal 20 to its full release position, as shown in Fig. 1, and the circuit of the magnet 31 being opened when the member 48 moves away from the screw 47, by the action of spring 50 on the arm 44, the valve 32 is moved to its seat by the spring 51 and the valve 33 is unseated, permitting fluid in the brake cylinder to exhaust through pipe 34 to the atmosphere by way of the exhaust port 35.

It will now be evident that with my improved equipment, the operator may at any time, quickly obtain full main reservoir pressure on the brake cylinder, as in case of an emergency, or full main reservoir pressure will be obtained in the brake cylinder, if the operator should accidentally or intentionally remove his foot from the foot pedal.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

In a fluid pressure brake, the combination with a brake cylinder, a source of fluid under pressure and a brake valve device comprising a valve for controlling the supply of fluid under pressure to the brake cylinder, a spring, a movable abutment subject to the opposing pressures of said spring and the pressure of fluid supplied to the brake cylinder for operating said valve, and a manually operable member movable in an application zone in which zone the pressure of said spring on said abutment is varied, of means operable upon movement of said member to a certain position within the limits of said application zone, for supplying fluid under pressure from said source of fluid under pressure to the brake cylinder.

CLYDE C. FARMER.